No. 771,884. PATENTED OCT. 11, 1904.
N. H. PIFFARD-FRANCIS.
DISAPPEARING FAUCET.
APPLICATION FILED NOV. 27, 1903.
NO MODEL. 2 SHEETS—SHEET 1.
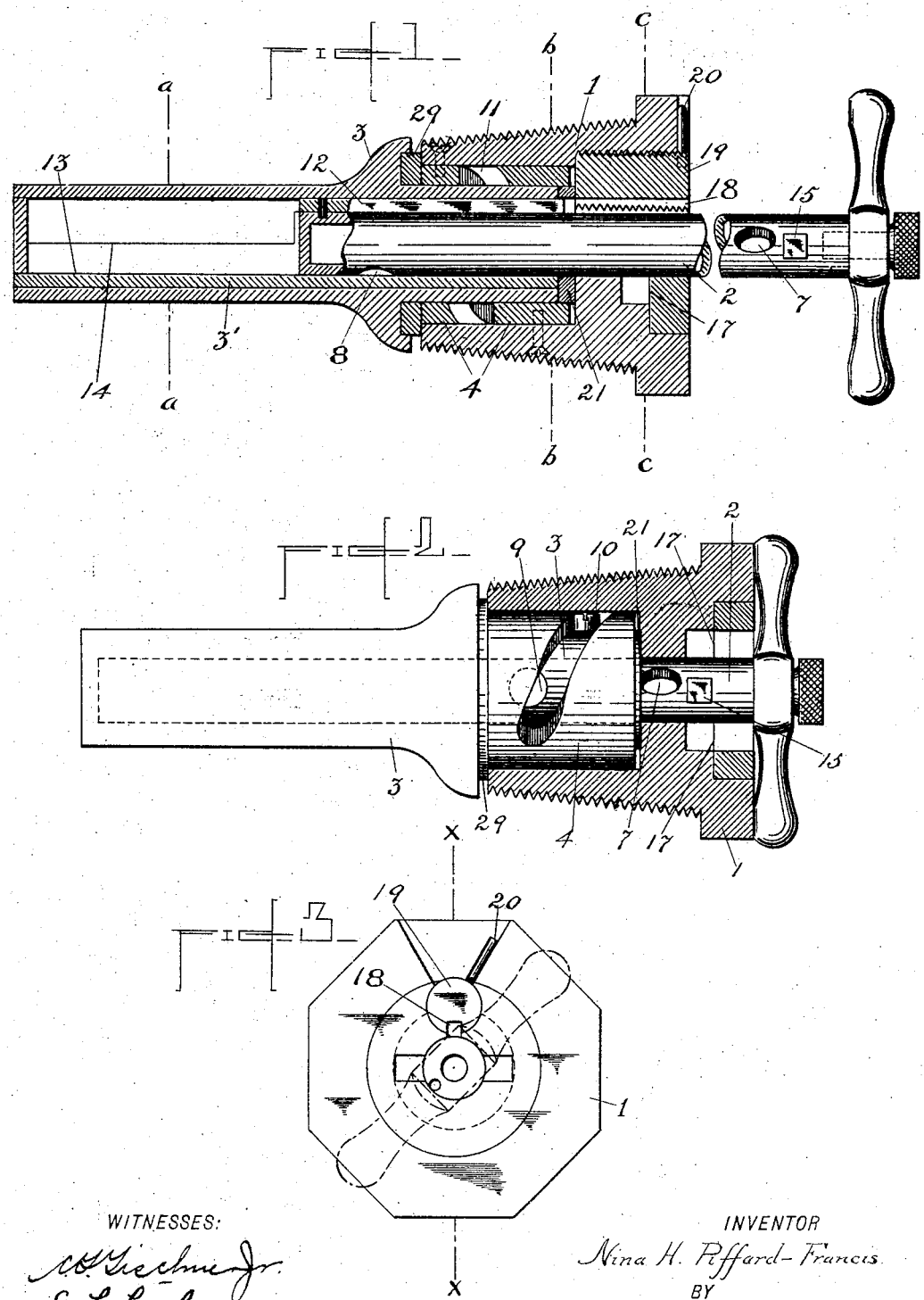
WITNESSES:
INVENTOR
Nina H. Piffard-Francis
BY
Townsend Decker
ATTORNEYS

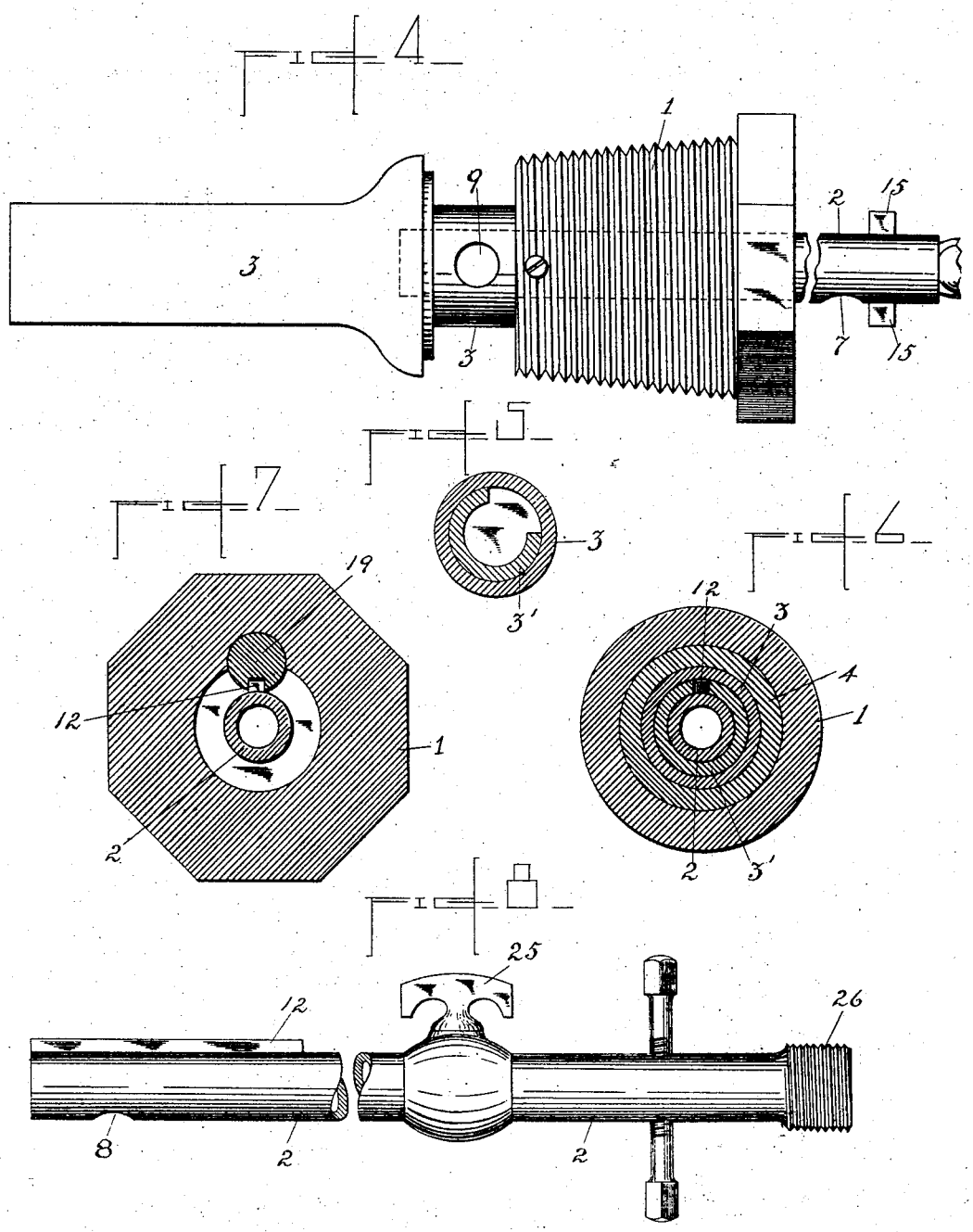

No. 771,884.

Patented October 11, 1904.

UNITED STATES PATENT OFFICE.

NINA H. PIFFARD-FRANCIS, OF NEW ROCHELLE, NEW YORK.

DISAPPEARING FAUCET.

SPECIFICATION forming part of Letters Patent No. 771,884, dated October 11, 1904.

Application filed November 27, 1903. Serial No. 182,711. (No model.)

*To all whom it may concern:*

Be it known that I, NINA H. PIFFARD-FRANCIS, a citizen of the United States, and a resident of New Rochelle, in the county of Westchester and State of New York, have invented certain new and useful Improvements in Disappearing Faucets, of which the following is a specification.

My invention relates to that class of faucets for barrels, casks, and other receptacles in which the bung or bushing carries a suitable plug or valve which may be operated by inserting the faucet proper into the bung or bushing and turning said faucet to cause the plug or valve to uncover the ports by which the liquid may escape from the cask through the bung or bushing and the faucet.

My invention relates more particularly to an organization such that the faucet proper may be pushed inward through the bung or bushing and caused to disappear entirely within the cask when not in use for withdrawing the contents.

One of the objects of my invention is to permit the plug or valve to be firmly seated against a seat upon the bung or bushing, while at the same time permitting the faucet to be entered or caused to recede while the plug or valve is thus seated.

Another object of my invention is to permit the plug to be caused to fully disappear by a simple longitudinal or axial movement of the same while the plug or valve proper is fully engaged with its seat upon the bung.

A further object of my invention is to construct the combined bung and faucet of the general character above described in such a way that it may be cheaply constructed, while at the same time being certain in operation and composed of comparatively few parts.

It has before my present invention been proposed to so construct the device that the faucet may be entered within the barrel by a rotary movement, carrying the plug or valve upon its inner end, the escape of the liquid being under such conditions prevented by reason of the position of the ports in the faucet itself. This movement of insertion of the faucet proper has been in one case a screw movement, while in another case the insertion has been effected by a longitudinal or axial movement inward; but in both cases the plug or valve proper has been carried upon the inner end of the faucet. My present invention differs from such previous construction in that when the faucet is fully inserted the plug is fully seated against the bung or bushing.

One part of my invention consists in providing a plug or valve with a hollow rearward extension of proper lateral dimensions and of such length that the faucet or key used in operating the plug or valve may be moved longitudinally inward to a sufficient extent to cause the exterior parts thereof outside the bung or bushing to disappear.

My invention relates also to certain improved combinations of devices, consisting in the combination, with the plug or valve having a rearward extension, of means for unseating the valve by rotation thereof by the faucet or key, which itself after seating is adapted to be moved longitudinally inward, so as to bring its rearward end within the hollow rearward extension of the valve.

Another feature of my invention relates to the combination of devices for permitting the plug or faucet to be manipulated and to be at all times positively attached or connected to the bung or bushing, while at the same time making proper provision for moving the faucet longitudinally inward to cause it to disappear. This part of my invention consists, essentially, in the combination, with the bung or bushing, of an internal bushing provided with proper slots or inclined ways and engaged by pins or projections from the plug at all times, a faucet adapted to be inserted axially into the hollow barrel of the plug and provided with a feather or spline engaging with the plug to rotate the same, said feather, web, or spline being of such dimensions that the faucet cannot be turned to manipulate the plug while the ports in the plug and the faucet proper register with one another.

My invention consists, further, in the features of construction and combinations of devices, as hereinafter more particularly set forth and claimed.

Referring to the accompanying drawings,

Figure 1 is a longitudinal section of a device embodying my invention and shows the plug engaged with its seat on the bung and the faucet inserted into position for unseating said plug. Fig. 2 is a side elevation of the same parts, showing the bung or bushing in longitudinal section, taken on the line at right angles to the view Fig. 1, but with the faucet fully inserted, so as to cause it to disappear. Fig. 3 is an end elevation of the device. Fig. 4 is a side elevation showing the position of the parts with the plug unseated and the faucet sufficiently drawn out to permit escape of the liquid, a portion of the barrel of the faucet, however, being shown broken out. Fig. 5 is a vertical cross-section on the line $a\,a$, Fig. 1. Fig. 6 is a vertical cross-section on the line $b\,b$, Fig. 1. Fig. 7 is a vertical cross-section on the line $c\,c$, Fig. 1. Fig. 8 is a modification.

1 is the usual bung or bushing of metal, having a screw-thread on its exterior to adapt it to be fixed in the head of the barrel or cask. 2 is the faucet proper, which is in the form of a hollow cylinder and is adapted to be inserted into and through the cylindrical opening in the bung. The barrel of the faucet 2 is provided with ports 7 and 8. Through one of these ports, 7, the liquid escapes from the faucet, and through the other, 8, the contents of the barrel enter the faucet through a port in the plug or valve with which the port 8 is caused to register by an axial movement of the faucet when the plug or valve is unseated.

3 is a plug or valve which, as shown in Fig. 1, engages a valve-seat on the inner end of the bung or bushing 1, where a tight joint may be formed by means of the gasket or washer 29, fixed in the end of the plug or valve. Said plug 3 is also in the form of a hollow cylinder, the rear end of which, 3′, receives the faucet when the same is pushed in, as shown in Fig. 2. The forward end of the plug is provided with a port 9, which is masked within the bung, as indicated in Fig. 2, when the plug or valve is seated. When the plug or valve is unseated or in the position shown in Fig. 4, the contents of the cask or barrel pass through the port 9 and through the port 8, caused to register therewith by an axial movement of the faucet, and thence through the hollow barrel of the faucet and out by the port 7. The inner end of the plug-barrel is provided with one or more pins 10, which engage with inclined ways or slots 11, formed in a bushing or interior sleeve 12, suitably fixed in the barrel of the bung or bushing 1. It is obvious that by turning the plug 3 it may be caused to recede inwardly to position shown in Fig. 4 for the purpose of allowing the contents of the cask to enter the barrel of the plug, while by turning it in the opposite direction it will be caused to seat itself firmly against the end of the bung or bushing, at which time the port 9 will be entered within the said bung or bushing. The turning of the plug is effected by turning the faucet 2, which latter is provided with a feather or web 12, suitably secured to the barrel of the faucet. The hollow barrel of the plug has fixed within it a sleeve 13, forming a constituent part of the plug-barrel, and the web or feather 12 is adapted to be engaged with a longitudinal slot or way in said interior sleeve 3′, as indicated in Fig. 6, for the purpose of turning the plug and causing it to recede within the barrel. In the extension 3′ of the plug this slot or way which receives the spline or web 12 is enlarged circumferentially, as indicated in Fig. 5 and in the section Fig. 1, where the line 14 shows the boundary of the enlargement. This enlargement permits the faucet to be partially turned within the plug when it is fully inserted, as shown in Fig. 2, in which position it will be locked against withdrawal by reason of the engagement of the pins and projections 15 with the shoulder or shoulders (indicated at 17) in the head of the bung or bushing. These shoulders are formed by circumferential enlargements of the slot 18 at the edge of the cylindrical opening through the head of the bung, which slot receives the feather or web 12 to permit the faucet to be inserted. This slot 18 may be formed in a cylinder 19, inserted in the head of the bung and adapted to be turned therein by means of the arm 20. For convenience the cylinder 19 is screw-threaded and engages with a screw-threaded opening tapped in the head of the bung. The arm or pin 20 after insertion of the cylinder 19 is secured thereto, and the movement of the latter being limited by the terminal walls of the recess in which it is located it is obvious that the cylinder 19 cannot become accidentally displaced. Between the inner end of the barrel of the plug and the head of the bung or bushing, a gasket 21 may be inserted to still more fully prevent the escape of liquid when the plug is seated.

In the operation of this apparatus the cylinder 19 is turned so that the slot 18 in its edge will register with the slot formed on the interior of the barrel of the plug. The faucet proper is then entered longitudinally through the bung, its feather or web 12 passing through the slot 18. When the outer end of said feather or web has cleared the head of the bushing or the plug 18 with its slot, the faucet may then be turned; but in this position it will be noted that the inner port 8 does not register with the port 9 in the plug. The feather or web 12 being now keyed to the plug, the latter will be rotated by turning the faucet and the pin or pins 10 on the plug being engaged with inclined ways or slots 11 in the fixed portion of the device—namely, the sleeve 4 on the interior of the bung—it is obvious that the plug is caused to recede inwardly to the position indicated in Fig. 4, in which position the port 9 is uncovered. This turning movement, however, cannot begin so as to unseat the plug from the bushing until the feather or web 12 has been brought so far inwardly as to clear the slot 18 in the head of the bung, at which time the port 8, as before stated, will not register with the port 9. After the plug has been fully unseated, a slight axial movement of the faucet outwardly will cause the ports 8 and 9 to register, and thus permit the liquid to flow from the cask or barrel. To shut off the flow of liquid, the faucet is rotated in the reverse direction, thus fully setting the plug and masking the port 9. After this, if desired, the faucet may be fully inserted to the position shown in Fig. 2, and, if desired, the handle thereof, if detachable, may be then removed, leaving no exposed parts. In this position the faucet is held against removal by the pins or projections 15. When the plug is opened, the faucet cannot be withdrawn, because in such position of the plug the feather or web 12 will be out of registry with the slot 18 through the head of the bung. When the plug is fully seated, the faucet may be readily withdrawn, or, if desired, this withdrawal may be prevented by turning the locking cylinder or plug 19 so as to carry the slot 18 out of registry with the feather or rib.

It is obvious that the outer end of the faucet may be provided with any desired attachments. For instance, as indicated in Fig. 8, the plug-valve 25 may be provided and the outer end may be screw-threaded, as indicated at 26, to permit a pipe to be coupled thereto for conveying liquid to a distant point.

What I claim as my invention is—

1. The combination with a bushing, of a plug or valve connected to the inner end thereof and provided with a rearward hollow extension, and a faucet or key the rear end of which enters the said rearward hollow extension by a longitudinal movement of the key or faucet inward after the plug or valve is seated, as and for the purpose described.

2. The combination with a hollow bung or bushing, a plug or valve adapted to close the same at its inner end, a faucet having a web or feather adapted to engage a slot or way in the plug and means for causing axial movement of the plug when rotated by the faucet and a rearward extension of the plug adapted to receive said faucet when pushed inwardly after seating the plug.

3. In a combined bung or faucet, the combination of a hollow plug the barrel of which is provided with a suitable port or opening, means for seating the plug and masking said port by rotation thereof, and a faucet adapted to enter the plug and having a port which may be caused to register with the port within the plug by a longitudinal movement of said faucet, as and for the purpose described.

4. In a combined bung or faucet, the combination with a plug or valve having a port and a faucet provided with a port adapted to register with the same by a longitudinal movement of the faucet, means for locking the plug and faucet together to permit the plug to be rotated so as to uncover the port therein and means for preventing rotation of the faucet to unseat the plug while the port in the plug and in the faucet register.

5. In a combined bung and faucet, the combination of a bung having a bushing provided with inclined ways or slots, a valve or plug at the inner end of the bung provided with pins engaging said ways or slots, a valve having a fin web or feather extending longitudinally of the same, and a longitudinal slot on the inside of the plug adapted to register with a slot in the head of the bushing which receives the web or feather on the faucet.

6. The combination substantially as described, of a hollow bung or bushing provided on its inside with inclined guideways or slots, a plug or valve having pins engaged with the same and provided with a hollow body or barrel and a faucet adapted to enter said hollow barrel or body by a longitudinal movement and having a port or opening adapted to register with the port or opening in the barrel or body of said plug or barrel.

7. In a combined bung and faucet, the combination with the bung, of a valve connected thereto and having a hollow barrel or body, a port or opening therein, a faucet adapted to enter said hollow barrel or body and having a port or opening which may be caused to register with the port or opening in the barrel of the plug or valve, means for rotating the plug by turning the faucet and means for unseating the plug or valve by such turning movement.

8. The combination with the bung or faucet having an opening through its head to receive a faucet, a feather or projection on said faucet and a rotatable plug or cylinder in the head of the bung having a slot adapted to receive the web or feather on the faucet in one position, as and for the purpose described.

9. In a combined bung and faucet, the combination with the bung, of a valve having a hollow body extending rearwardly or inwardly, and a key or faucet for operating said valve to open and close the same, said key or faucet being adapted to be slid inwardly after closure of the valve to bring its rearward end within the said rearward hollow extension after the valve is closed.

10. The combination with a hollow bung or bushing, of a plug or valve, a rotatable and longitudinally-movable faucet or key, means for causing axial movement of the valve by rotation of said faucet or key, and a rearward extension of the valve adapted to receive the rear end of the faucet when the same is pushed inwardly after closing the valve.

11. The combination with a hollow bung or bushing, of a valve adapted to close the same at its inner end, means for causing the valve to open and close by rotation thereof, a key or faucet rotatably and longitudinally movable in said bung or bushing, means for rotating the valve to close the same and a hollow rearward extension of the valve adapted to receive the inner end of the faucet after the same has been operated to cause the valve to close.

12. In a combined bung and faucet, the combination with a bung, of a valve or plug adapted to be unseated by rotation and a faucet having a feather or rib adapted to pass through a slot in the head of the bung and to engage the plug, and a slot on the inside of said plug for receiving said rib or feather, said slot being enlarged circumferentially at the inner end of the plug to permit the faucet to be turned when fully inserted and locked against withdrawal.

Signed at New York city, in the county of New York and State of New York, this 13th day of November, A. D. 1903.

NINA H. PIFFARD-FRANCIS.

Witnesses:
C. F. TISCHNER, Jr.,
E. L. LAWLER.